3,370,486
VEHICULAR DRIVING AXLE
Alan S. Lamburn, Kencott, via Lechlade, England, assignor to Axel Wickman Transmissions Limited, Coventry, England
Filed Nov. 13, 1964, Ser. No. 410,850
Claims priority, application Great Britain, Nov. 22, 1963, 46,154/63
3 Claims. (Cl. 74—695)

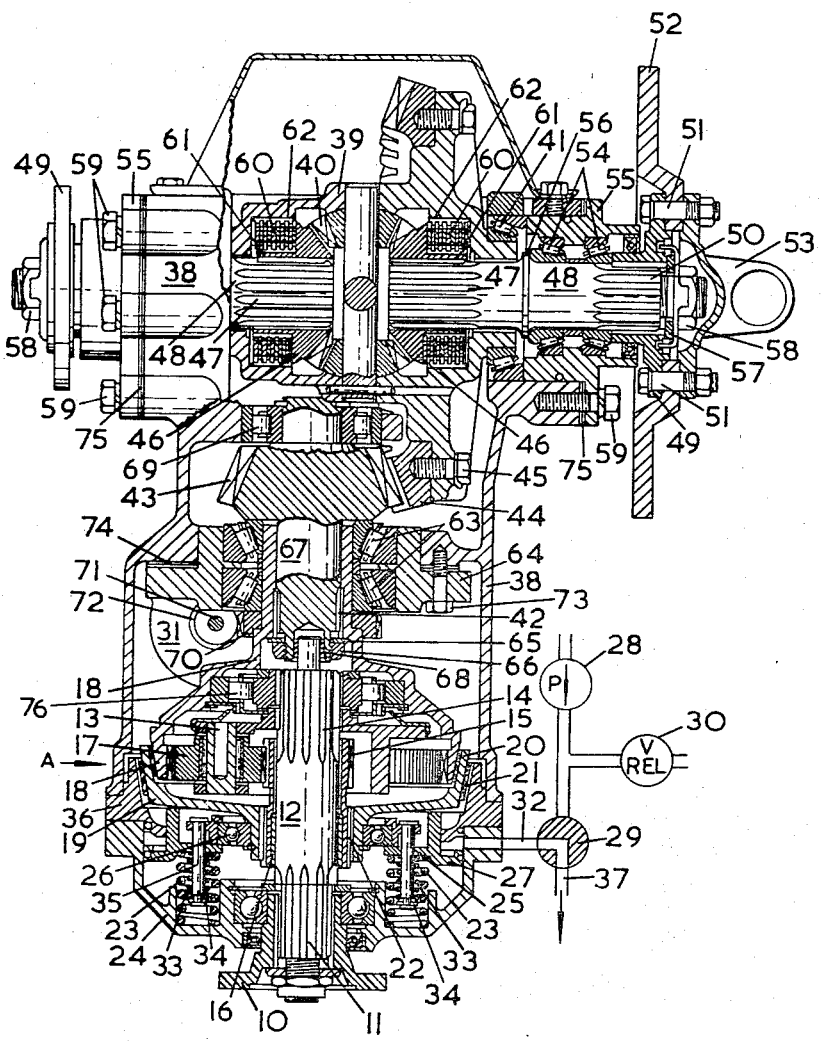

The invention relates to an axle for driving the road wheels of a motor vehicle. The power transmission systems of the majority of motor vehicles comprise a prime mover arranged at one end of the vehicle and connected to drive the power input shaft of a main change-speed gearing arranged at the same end of the vehicle, the power output shaft of the main change-speed gearing being connected by a propeller shaft to drive an axle at the other end of the vehicle. With this type of power transmission system an auxiliary change-speed gearing, such as an epicyclic overdrive or underdrive, is frequently arranged either between the engine and the power input shaft of the main change-speed gearing, or between the power output shaft of the main change-speed gearing and the propeller shaft. Also with this type of power transmission system the driving axle must be provided with a right-angle drive, such as a hypoid crown wheel and pinion, and the pinion is conventionally supported by thrust bearings for absorbing the end thrust generated on the pinion when it is transmitting torque to the crown wheel. An object of the invention is to provide an improved axle for driving the road wheels of a motor vehicle.

According to the invention, an axle for driving the road wheels of a motor vehicle, includes a right-angle gear drive in which a driving gear is supported by a thrust bearing and meshes with a driven gear for driving the said road wheels, a two-speed epicyclic gearing is carried by the axle and is provided with an axially-movable friction engaging member which is rotatively fast with the reaction member of the epicyclic gearing, the friction engaging member being arranged optionally to engage a brake surface rotatively fast with the axle casing for the epicyclic gearing to transmit drive at a planetary ratio, or to engage a clutch surface formed on a power output member of the epicyclic gearing for the latter to transmit drive at unit ratio, the power output member of the epicyclic gearing is drivingly connected to the driving gear of the right-angle gear drive and is supported by the same thrust bearing, and the friction engaging member together with the clutch surface formed on the power output member of the epicyclic gearing and the driving gear of the right-angle gear drive are so arranged that the axial reaction, on the power output member of the epicyclic gearing due to the force of engagement of the clutch member with the clutch surface formed on the power output member, is opposed to the end thrust generated when the driving gear transmits torque to the driven gear.

A power input shaft of the epicyclic gearing may be connected to drive a planet carrier having planet gear wheels interconnecting at annulus gear wheel and a sun gear wheel which constitutes the said reaction member of the epicyclic gearing, and the annulus gear wheel constitutes the said power output member of the epicyclic gearing.

The power input shaft of the epicyclic gearing may be journalled coaxially in a shaft drivingly connected to the driving gear of the right-angle gear drive.

A speedometer drive may be rotatively fast with the driving gear of the right-angle gear drive and is arranged between the power output member of the epicyclic gearing and said driving gear. If desired, the speedometer drive may also provide a drive to a pump for supplying oil under pressure for operating the epicyclic gearing.

The invention is illustrated, by way of example only, by the accompanying drawing which is a horizontal axial section of an axle for driving the road wheels of a motor vehicle.

In the drawing a flange 10 is adapted to be driven by a conventional propeller shaft from a prime mover and a main change-speed gearing which are arranged at the opposite end of the vehicle. The flange 10 is drivingly connected by splines 11 to a power input shaft 12 of a two-speed epicyclic gearing which is indicated generally by arrow A. Power input shaft 12 is connected to drive a planet carrier 13 through splines 14, and supports a sun gear wheel 15 through a journal bearing 16. A planet gear wheel 17 is journalled from the planet carrier 13 and meshes with the sun gear wheel 15 and with an annulus gear wheel 18 which constitutes the power output member of the epicyclic gearing A.

A friction engaging member 19 is provided with a frusto-conical clutch pad 20 and a frusto-conical brake pad 21, and is drivingly connected to the sun wheel 15 by splines 22 which allow the clutch member 19 to be moved axially relatively to the sun wheel 15. A series of compression coil springs 23 is arranged in a circle about shaft 12 and react between a casing 24 and an annular flange 25 which engages a thrust race 26 to urge the clutch pad 20 of friction engaging member 19 into engagement with a frusto-conical clutch surface formed on the annulus gear wheel 18. The frictional engagement of clutch pad 20 with the annulus gear wheel prevents relative rotation between the sun gear wheel 15 and the annulus gear wheel 18 and causes the epicyclic gearing A to transmit drive at unit ratio.

The flange 25 is formed integral with an annular piston 27 which is sealingly guided for axial movement by the casing 24. A pump 28 is shown diagrammatically in the drawing supplying a control valve 29 with oil under a pressure determined by a relief valve 30. The pump 28 is actually disposed inside a casing 31 and is driven in a manner that will be described later. However the control valve 29 can be operated, for example by a solenoid actuated by an electrical switch arranged on the vehicle dashboard, to connect the supply of oil under pressure from pump 28 to a passage 32 which leads to the operative surface of annular piston 27. When oil is supplied through passage 32 the piston 27 causes flange 25 to relieve the force of springs 23 from thrust race 26 and to apply an opposite force to the thrust race through a series of compression coil springs 33, circlips 34 and studs 35 which are held axially fast with the thrust race 26. The axial force applied to the thrust race 26 through studs 35 moves the friction engaging member 19 axially along splines 22 for the clutch pad 20 to disengage the annulus gear wheel 18, and for the brake pad 21 to engage a frusto-conical brake surface formed on a ring 36 fast with the casing 24. The frictional engagement of brake pad 21 with the ring 36 holds the sun gear wheel 15 rotatively stationary and causes the epicyclic gearing A to transmit drive at its planetary overdrive ratio. When the control valve 29 is returned to the position illustrated, the oil acting on the annular piston 27 is exhausted through the passage 32 and a passage 37 which discharges into an oil sump defined by casing 24, ring 36 and by an axle casing 38.

In the axle casing 38 a cage 39, for a differential gearing 40, is supported by two bearings 41 only one of which is shown, and is driven from the annulus gear wheel 18 of the epicyclic gearing A through splines 42 and a pinion 43 which meshes with a crown wheel 44 connected to the cage 39 by bolts 45. The differential gearing 40 includes a pair of sun wheels 46 connected by splines 47 to drive halfshafts 48 which are arranged to drive hubs 49 through splines 50. As indicated on the right-hand side of the drawing, each hub 49 may be secured by a series of bolts 51 to a brake disc 52 and to a universal joint, part of which is indicated at 53. Each halfshaft 48 is supported by combined thrust and journal bearings 54 in a housing 55 and is located axially by an integral flange 56, washer 57, and a nut 58 which urges hub 49 towards flange 56. Each housing 55 is arranged in a bore formed in the axle casing 38 and is kept in place by a series of bolts 59 which coact with threaded bores in the axle casing 38.

A series of clutch plates 60 is arranged between an externally-splined portion 61 of each sun wheel 46 and an internally-splined portion 62 of the cage 39 so that alternate clutch plates of each series are drivingly connected to the cage 39 and the remaining clutch plates are drivingly connected to the sun wheels 46. In this manner the end thrust generated on the sun wheels 46, due to the cage 39 transmitting torque to the halfshafts 48, urges the clutch plates 60 of each series into frictional contact to impose a frictional drag between each sun wheel 46 and the cage 39 whereby to control the extent of differential motion between the halfshafts 48.

The annulus gear wheel 18 and the pinion 43 are supported by combined thrust and journal bearings 63 in a housing 64, and are held axially fast by a washer 65 and a nut 66 coacting with the pinion shaft 67 which additionally provides a spigot bearing 68 for the power input shaft 12. The pinion 43 is additionally supported from the axle casing 38 by a roller bearing 69 so that journal loads imposed on the pinion 43 are distributed between bearings 63 and 69. An axial force is generated on the pinion 43 when it transmits torque to the crown wheel 44, and this force is proportional to the torque transmitted and is directed towards the power input shaft 12 when the vehicle is being driven forwards. This axial force is resisted solely by bearings 63 which also serve to resist the axial reaction on the annulus gear wheel 18 caused by the engagement of clutch member 19 under the influence of springs 23. However, the axial reaction on the annulus gear wheel 18 is opposed to the end thrust generated by the pinion 43 and this reduces the axial force that the bearings 63 have to carry.

The axial force on the bearings 63 is only reduced when the unit ratio of the epicyclic gearing A is engaged. This is, however, preferable with the embodiment illustrated as the torque transmitted by the pinion 43 is, for a given power output of the prime mover, inversely proportional to its speed and the torque transmitted by the pinion, and thus the end thrust generated is greater when unit ratio of the epicyclic gearing A is engaged than when the overdrive ratio is engaged.

A skew gear wheel 70 is trapped axially between the annulus gear wheel 18 and the inner race of one of the bearings 63 by the action of nut 66, and is accordingly driven at the same speed as the annulus gear wheel. Gear wheel 70 drives a shaft 71, arranged at right-angles to the power input shaft 12, through a coacting skew gear wheel 72 and the shaft 71 is arranged to drive the pump 28 which is arranged, as previously stated, in the casing 31. If desired, the shaft 71 may also serve as a speedometer drive.

The housing 64 is secured to the axle casing 38 by bolts 73, and shims 74 are arranged between housing 64 and casing 38 for adjusting the presentation of the pinion 43 to the crown wheel 44. Transverse adjustment of the crown wheel 44 is obtained by shims 75 arranged between each housing 55 and the axle casing 38, the transverse position of the crown wheel 44 being determined by the engagement of housings 55 with the outer races of the bearings 41. A one-way clutch 76 is provided to prevent the annulus gear wheel 18 from rotating slower than the power input shaft 12.

The particular epicyclic gearing illustrated may be replaced, if desired, by other epicyclic gearings which provide either overdrive or underdrive ratios.

Throughout this document the word "axle" is used to define both rigid beam axles and axles of the kind which drive independently suspected road wheels. However, although the two-speed epicyclic gearing may be applied to a rigid beam axle, it is preferable to use it with an axle which is mounted substantially rigidly from the chassis frame or the like and drives independently supported road wheels, whereby the weight of the epicyclic gearing is not added to the unsprung weight of the axle.

What I claim as my invention and desire to secure by Letters Patent of the United States is:

1. An axle for driving road wheels of a motor vehicle, including an axle casing, a bevel driving gear including a driving stub shaft, a thrust bearing receiving said stub shaft therein for supporting the driving gear in said axle casing for rotation about its axis, a bevel driven gear meshing with said driving gear and constituting part of a driving axle differential, said driving gear when transmitting torque to the driven gear for driving said motor vehicle forward generating an axial thrust in one direction, said thrust bearing being positioned closely adjacent said driving gear to transmit the axial thrust generated by said driving gear to said casing, a two-speed epicyclic gearing carried by said axle casing adjacent said thrust bearing but on the side thereof remote from said driving gear, a reaction member for said epicyclic gearing, an axially movable friction engaging member rotatively fast with said reaction member, a stationary member mounted on the axle casing and defining a brake surface, a power output member for said epicyclic gearing including a hollow stub shaft enclosed in said thrust bearing to be supported thereby, the stub shaft of said driving gear being keyed within said hollow stub shaft of said power output member of the epicyclic gearing, said power output member of the epicyclic gearing being axially located by said thrust bearing, said power output member of the epicyclic gearing defining a clutch surface facing generally away from said driving gear, fluid operated means for urging said friction engaging member into engagement with said stationary member to transmit drive at the planetary ratio and biasing means to normally urge said friction engaging member into engagement with said clutch surface so that the epicyclic gearing will transmit drive at unit ratio, the engagement of said friction engaging member by said bias means urging said friction engaging member in the direction to oppose the axial thrust by said driving gear in the said one direction so as to reduce the total axial thrust transmitted by said thrust bearing to the casing.

2. The axle of claim 1 in which said driving stub shaft includes a co-axial journal in its end and said reaction member is carried by a co-axial portion supported by said co-axial journal.

3. The axle of claim 1 in which a first gear is provided fixed to rotate with said power output member of said epicyclic gearing adjacent said thrust bearing, a speedometer drive and a fluid pump for supplying fluid under pressure for operating said fluid operated means and said speedometer drive and fluid pump each being driven by a second gear means meshing with said first gear.

References Cited

UNITED STATES PATENTS

| | | | |
|---|---|---|---|
| 2,097,021 | 10/1937 | De Normanville | 74—781 |
| 2,174,672 | 10/1939 | Soden-Fraunhofen | 74—763 |
| 2,241,088 | 5/1941 | Griswold | 74—781 |
| 2,312,263 | 2/1943 | Ormsby | 74—781 X |
| 2,437,517 | 3/1948 | Greenlee | 74—781 |
| 2,450,073 | 9/1948 | Avila | 74—695 |
| 2,694,948 | 11/1954 | McFarland | 74—752 X |
| 2,716,359 | 8/1955 | Forster | 74—781 |
| 2,720,120 | 10/1955 | Orr et al. | 74—781 X |

(Other references on following page)

UNITED STATES PATENTS

| | | | |
|---|---|---|---|
| 2,791,130 | 5/1957 | Boughner | 74—695 |
| 2,804,957 | 9/1957 | Pechin | 192—66 |
| 2,806,387 | 9/1957 | Forster et al. | 74—781 X |
| 2,831,372 | 4/1959 | Boughner | 74—695 X |
| 3,126,749 | 3/1964 | Babcock | 74—15.2 |
| 3,182,528 | 5/1965 | Lamburn | 74—781 X |
| 3,251,247 | 5/1966 | Lamburn | 74—781 X |

FOREIGN PATENTS 1,120,138  7/1956  France.

DONLEY J. STOCKING, Primary Examiner

DAVID J. WILLIAMOWSKY, Examiner.

J. R. BENEFIELD, Assistant Examiner.